US011351960B2

(12) United States Patent
Giraud et al.

(10) Patent No.: US 11,351,960 B2
(45) Date of Patent: Jun. 7, 2022

(54) VEHICLE OPERATION WITH DOCKED SMART DEVICE

(71) Applicant: Damon Motors Inc., Vancouver (CA)

(72) Inventors: Damon Jay Giraud, North Vancouver (CA); Dominique Kwong, Coquitlam (CA); Raymond C. L. Leung, Vancouver (CA)

(73) Assignee: Damon Motors Inc., Vancouver (CA)

( * ) Notice: Subject to any disclaimer, the term of this patent is extended or adjusted under 35 U.S.C. 154(b) by 17 days.

(21) Appl. No.: 16/972,771

(22) PCT Filed: Jun. 6, 2019

(86) PCT No.: PCT/CA2019/050794
§ 371 (c)(1),
(2) Date: Dec. 7, 2020

(87) PCT Pub. No.: WO2019/232636
PCT Pub. Date: Dec. 12, 2019

(65) Prior Publication Data
US 2021/0245601 A1 Aug. 12, 2021

Related U.S. Application Data

(60) Provisional application No. 62/681,835, filed on Jun. 7, 2018.

(51) Int. Cl.
*B60R 25/04* (2013.01)
*B60K 35/00* (2006.01)
(Continued)

(52) U.S. Cl.
CPC .............. *B60R 25/04* (2013.01); *B60K 35/00* (2013.01); *B60K 37/02* (2013.01); *B60R 11/0241* (2013.01); *B62J 50/225* (2020.02); *B60K 2370/176* (2019.05); *B60K 2370/178* (2019.05); *B60K 2370/566* (2019.05);
(Continued)

(58) Field of Classification Search
CPC ................. B60R 25/04; B60R 11/0241; B60R 2300/8026; B60R 2325/205; B60R 2325/306; B60K 35/00; B60K 37/02; B60K 37/06; B60K 2370/176; B60K 2370/178;
(Continued)

(56) References Cited

U.S. PATENT DOCUMENTS 10,650,621 B1* 5/2020 King .................. H04L 67/12
2008/0200209 A1* 8/2008 Cahoon .................. B60R 25/24
701/2

(Continued)

FOREIGN PATENT DOCUMENTS

CN 104806077 7/2015

*Primary Examiner* — Russell Frejd
(74) *Attorney, Agent, or Firm* — Damien G. Loveland

(57) ABSTRACT

A vehicle is equipped with a docking station for a driver's smart device. The smart device displays engine related and other information to the driver while operating the vehicle. The smart device provides a supplementary screen to the screen installed in the vehicle at manufacture, or acts as an alternative to having a screen installed at manufacture. The docked smart device replaces one or more of the instruments normally present in a vehicle dashboard or motorcycle instrument cluster. The smart device also controls operation of the vehicle.

21 Claims, 5 Drawing Sheets

(51) Int. Cl.
*B60K 37/02* (2006.01)
*B60R 11/02* (2006.01)
*B62J 50/21* (2020.01)

(52) U.S. Cl.
CPC .. *B60K 2370/573* (2019.05); *B60K 2370/834* (2019.05); *B60R 2300/8026* (2013.01); *B60R 2325/205* (2013.01); *B60R 2325/306* (2013.01)

(58) Field of Classification Search
CPC ........ B60K 2370/566; B60K 2370/573; B60K 2370/834; B62J 50/225; B62J 45/00
See application file for complete search history.

(56) References Cited

U.S. PATENT DOCUMENTS

| | | |
|---|---|---|
| 2014/0098060 A1 | 4/2014 | McQuade |
| 2015/0134428 A1* | 5/2015 | Li ............................ H04W 4/80 |
| | | 705/13 |
| 2017/0064056 A1* | 3/2017 | Uhlig ................ H04M 1/72409 |
| 2017/0352214 A1 | 12/2017 | Maiwand |
| 2018/0009316 A1* | 1/2018 | Dadoosh .............. H04B 1/3822 |

* cited by examiner

- PRIMARY DISPLAY — 172
- CONTROL MODULE — 180
  - POWER
  - DATA COMMS
- SENSORS — 132
- CAMERAS — 134
- WIRELESS CONNECTIVITY — 136
- ENGINE CONTROL UNIT — 111
- 170

FIG. 12

- SENSE — 200
- RECEIVE SIGNALS — 202
- ANALYZE SIGNALS — 204
- DETERMINE HAZARD — 206
- NOTIFICATION TO SMART DEVICE — 208

FIG. 13

- DOCK — 220
- AUTHENTICATE — 224
- IGNITION ENABLED — 228
- IGNITION ON — 232
- LOG DATA — 236

FIG. 14

- ON — 250
- START MOVING — 254
- DISPLAY SPEED — 258
- STOP MOVING — 262
- DISPLAY REAR-VIEW CAMERA IMAGE — 266

VEHICLE OPERATION WITH DOCKED SMART DEVICE

TECHNICAL FIELD

The present invention is related to docking a smart device in a vehicle. More specifically, it relates to a system, method and vehicle for incorporating control and display features of a smart device into the vehicle.

BACKGROUND

These days, smart devices have a major role in our daily life. The influx of information to these devices allows us to have a better control over how we use things generally. Display screens associated with vehicles have brought a series of improvements in the way we use our vehicles. For example, the implementation of a rear-view camera in a car for facilitating parking maneuvers is a valuable improvement for the drivers. Also, smart devices can be paired with vehicles to allow drivers to listen to the music stored on their devices or to make hands-free telephone calls while driving.

Today, motorcycle display system technology employs liquid crystal display panels capable of displaying vehicle information using a limited color palette. These types of display are fixed onto the motorcycle and are normally not user-removable. Moreover, running a software update on these systems can be difficult or impossible because of limited connectivity or access.

This background is not intended, nor should be construed, to constitute prior art against the present invention.

SUMMARY OF INVENTION

The present invention is related to a vehicle docking system that integrates a smart device or smartphone in the functioning of the vehicle. A docking station holds and connects the smart device to the vehicle. Information regarding the vehicle's status is provided to the connected smart device. The smart device can be used to control aspects of the vehicle. The smart device is fully removable from the docking station after being connected to it.

The invention involves a mount or holder for the smart device that supplies communications and power through a wired or wireless connection. Through an authentication process using an encrypted communication network, the smart device can be used to enable the ignition, for example. The integration of the smart device, when in the docking station, with the vehicle safety system allows it to provide alerts directly, or via the vehicle's speakers, display and/or haptic feedback devices such as vibration motors.

As an alternative method of authenticating the user, the smart device's tactile and facial recognition functions can be used to verify a user's identity and usage profile.

The smart device functions, or its presence serves, to operate one or more features of the vehicle, such as controlling a feature related to driving the vehicle, displaying information that would normally be displayed by an instrument cluster of a typical vehicle, or receiving an input that is used to control the vehicle.

The invention is described in relation to a motorcycle in particular, however, the invention may also be applied to other types of vehicle. Vehicles may be gasoline, diesel, ethanol, electric, hybrid, etc.

Disclosed herein is a system for operation of a vehicle with a personal communication device comprising: a docking station mounted in a cockpit of the vehicle, the docking station dimensioned to hold the personal communication device; and a control module that is mounted in the vehicle and communicatively connected to: an engine control unit (ECU) of the vehicle; and the personal communication device, when the personal communication device is in the docking station; wherein the control module comprises a processor and a non-transitory computer-readable memory storing computer-readable instructions which, when executed by the processor cause the control module to: detect a presence of the personal communication device in the docking station; authenticate the personal communication device in response to detecting its presence; send, in response to authenticating the personal communication device, a command to the ECU to enable an ignition of the vehicle; receive a parameter of the vehicle from the ECU; and transmit the parameter to the personal communication device for display on the personal communication device.

Also disclosed is a method for operating a vehicle with a personal communication device comprising: detecting, by a control module, a presence of the personal communication device in a docking station mounted in a cockpit of the vehicle, wherein the control module is mounted in the vehicle and communicatively connected to an engine control unit (ECU) of the vehicle; authenticating, by the control module, the personal communication device in response to detecting its presence; sending, by the control module, in response to authenticating the personal communication device, a command to the ECU to enable an ignition of the vehicle; receiving, by the control module, a parameter of the vehicle from the ECU; and transmitting the parameter to the personal communication device for display on a user interface thereof.

Further disclosed is a vehicle that uses a personal communication device for operation of at least one function of the vehicle comprising: a docking station mounted in a cockpit of the vehicle, the docking station dimensioned to hold the personal communication device; and a control module that is mounted in the vehicle and communicatively connected to: an engine control unit (ECU) of the vehicle; and the personal communication device, when the personal communication device is in the docking station; wherein the control module comprises a processor and a non-transitory computer-readable memory storing computer-readable instructions which, when executed by the processor cause the control module to: detect a presence of the personal communication device in the docking station; authenticate the personal communication device in response to detecting its presence; send, in response to authenticating the personal communication device, a command to the ECU to enable an ignition of the vehicle; receive a parameter of the vehicle from the ECU; and transmit the parameter to the personal communication device for display thereon.

BRIEF DESCRIPTION OF THE DRAWINGS

The following drawings illustrate embodiments of the invention, which should not be construed as restricting the scope of the invention in any way.

FIG. 3 is a drawing representing another smart device docking station according to an embodiment of the present invention.

FIG. 4 is a drawing representing a further smart device docking station according to an embodiment of the present invention.

FIG. 11 is a block diagram representing communication between a primary display, a control module and various other devices, according to an embodiment of the present invention.

FIG. 12 is a basic flowchart representing the relationship between a hazard detection and its notification, according to an embodiment of the present invention.

FIG. 13 is a flowchart representing key steps taken by the docking system when the smart device is connected to the docking station, according to an embodiment of the present invention.

FIG. 14 is a flowchart representing an example of the key steps for displaying various data by the docking system, according to an embodiment of the present invention.

DESCRIPTION

A. Glossary

The term "smart device" refers to a smartphone, an electronic tablet, or other personal electronic communication device equipped with a touchscreen or other user interface, which is able to communicate wirelessly and that can be programmed with processor-executable applications.

The term "engine control unit (ECU)" refers to the computer that controls and monitors various components and states of an engine.

The term "GPS" refers to global positioning system.

The term "haptic" refers to both the sense of touch (tactile feedback) and the ability to detect shape and forces (kinesthetic feedback). Tactile feedback is used to detect surface texture, temperature and vibrations, for example. Kinesthetic feedback is used to detect changes in shape, motion, forces and weights.

The term "module" can refer to any component in this invention and to any or all of the features of the invention without limitation. A module may be a software, firmware or hardware module, and may include one or more processors and computer-readable memories.

The term "processor" is used to refer to any electronic circuit or group of circuits that perform calculations, and may include, for example, single or multicore processors, multiple processors, an ASIC (Application Specific Integrated Circuit), and dedicated circuits implemented, for example, on a reconfigurable device such as an FPGA (Field Programmable Gate Array). The processor performs the steps in the flowcharts, whether they are explicitly described as being executed by the processor or whether the execution thereby is implicit due to the steps being described as performed by code or a module. The processor, if comprised of multiple processors, may be located together or separate from each other.

The term "rider" refers to the person who drives or controls a motorcycle, and is to be distinguished from a person who rides pillion on the motorcycle or otherwise as a passenger.

The term "RPM" refers to revolutions per minute, for example of a motorcycle engine.

The term "V2X" refers to technology that allows a vehicle to communicate with any moving device that may affect it, such as another vehicle or a pedestrian's smart device, and static objects such as traffic lights and buildings, as well as communication with a communications network or a power grid.

B. Exemplary Embodiments

Figure 1:
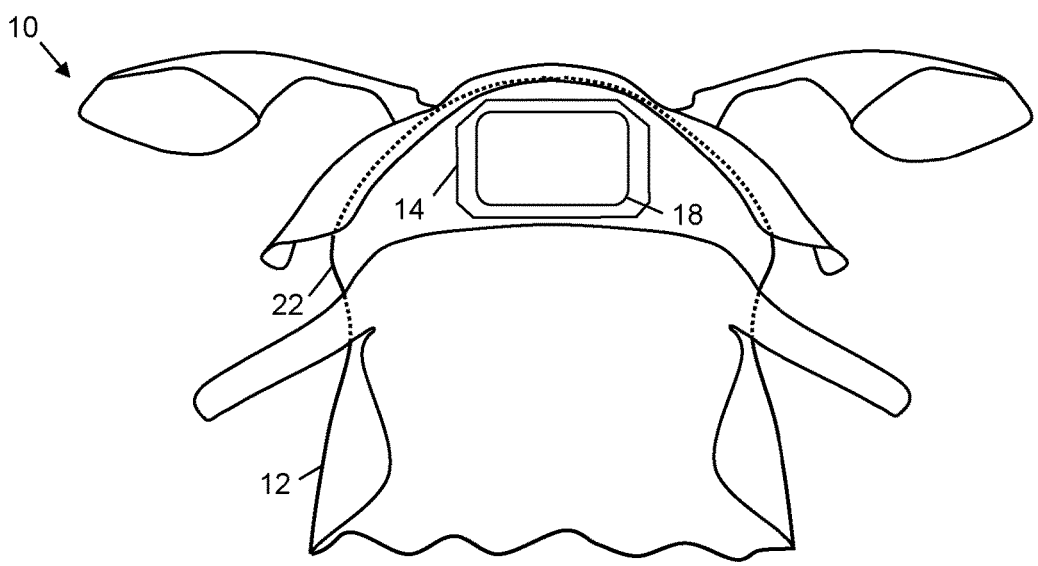
FIG. 1 is a drawing representing a motorcycle equipped with an empty smart device docking station as seen from the rider's perspective, according to an embodiment of the present invention.
Figure 2:
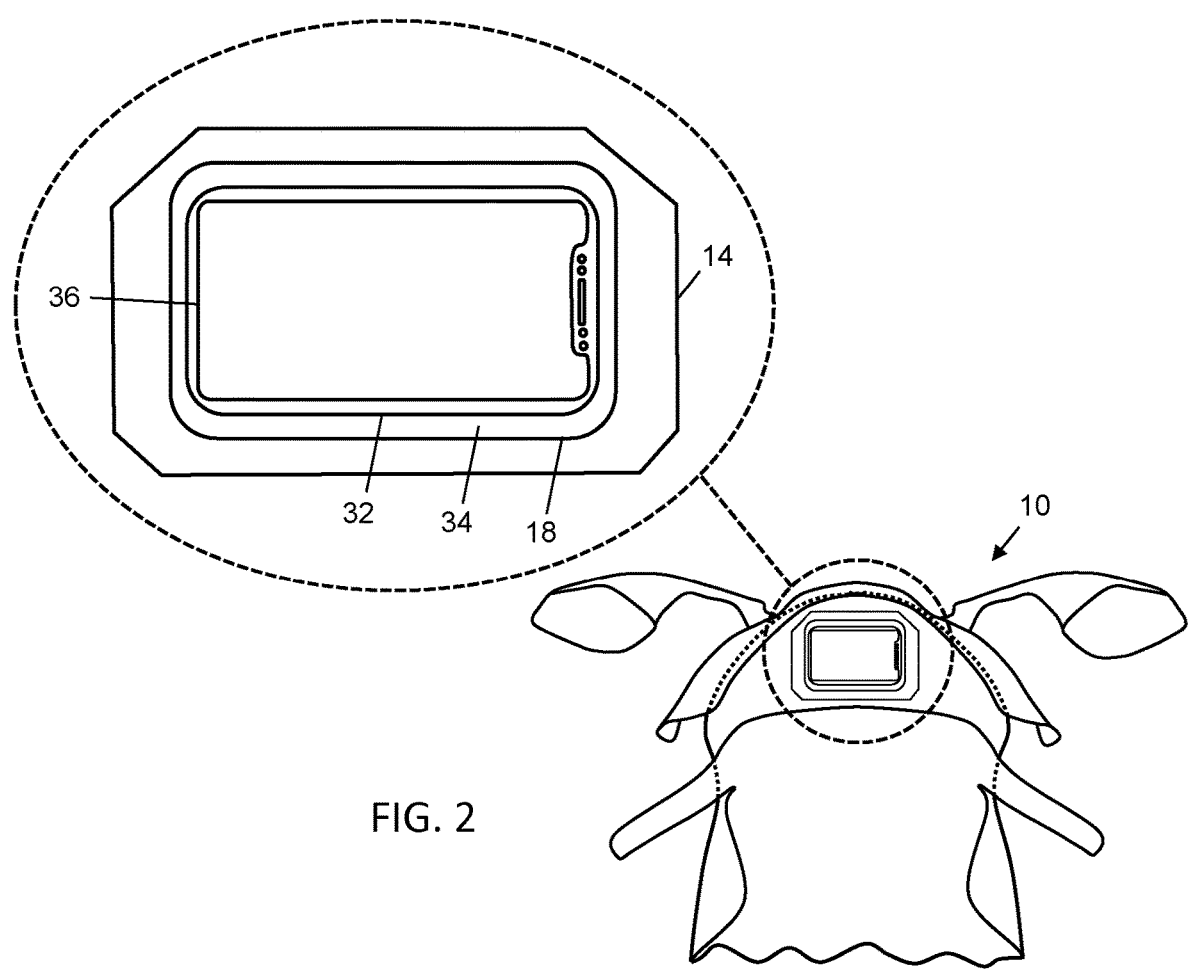
FIG. 2 is a drawing representing a motorcycle equipped with a smart device docking station with a smart device positioned in it as seen from the rider's perspective, with a close-up of the smart device docking station, according to an embodiment of the present invention.

Referring to FIG. 1, a front portion or cockpit 10 of a motorcycle 12 is shown with a docking station 14 having a docking recess 18, mounted on the dashboard 22. The docking station 14 is located on the motorcycle dashboard 22 in such a way that the docking station replaces one or more of the common gauges in the instrument cluster such as the speed gauge. Referring to FIG. 2, there is shown the motorcycle cockpit 12 with a close-up view of the docking station 14. A smart device 32 (e.g. personal communication device), which acts as the key to the motorcycle, is inserted in the docking recess 18 in the docking station 14. A rubber gasket 34 or other retaining component is located between the smart device 32 and the docking recess 18 in order to hold the smart device in position in the docking recess. The rubber gasket 34 facilitates the stabilization of the smart device position in the docking station 14 during the motorcycle ride, for example. During a motorcycle ride, the motorcycle 12 is subjected to vibrations or shocks that would otherwise disturb the position of the smart device 32 in the docking station 14. This may be detrimental to the quality of the communication between the smart device 32 and the rider of the motorcycle, and potentially between the smart device and a control module of the docking system.

The screen 36 of the smart device 32 permits the use of user-customizable displays in order to optimize vehicle information placement. Such information may include, for example, the motorcycle's speed, RPM, coolant temperature and odometer. The screen 36 may also be used to provide vehicle navigational instructions using the smart device's GPS. The screen 36 may also provide non-vehicle information such as traffic and weather information.

The smart device 32 is in some embodiments configured to dynamically display different information on the screen 36 depending on the motorcycle speed and activity. In some embodiments, the smart device 32 provides a supplemental display to a motorcycle that has a permanent, fixed screen.

Docking the smart device 32 also allows the smart device to be conveniently charged while docked to the dashboard 22. The smart device 32 may be charged via wireless charging or via wired charging, depending on the embodiment of the invention.

Besides the provision of information to the rider, the smart device integration with the motorcycle allows the smart device 32 to be used for logging of vehicle information, rider statistics, and system alerts. The smart device 32 may act as an internet gateway to connect the motorcycle 12 to a data cloud server where logged data is stored and analyzed. The smart device 32 may provide vehicle-to-vehicle communications with other motorcycles equipped with a similar docking station 14 and its associated technology.

The smart device 32, when present in the docking station 14, operates in some embodiments as a wireless key to unlock the motorcycle's ignition system.

Figures 3, 4:
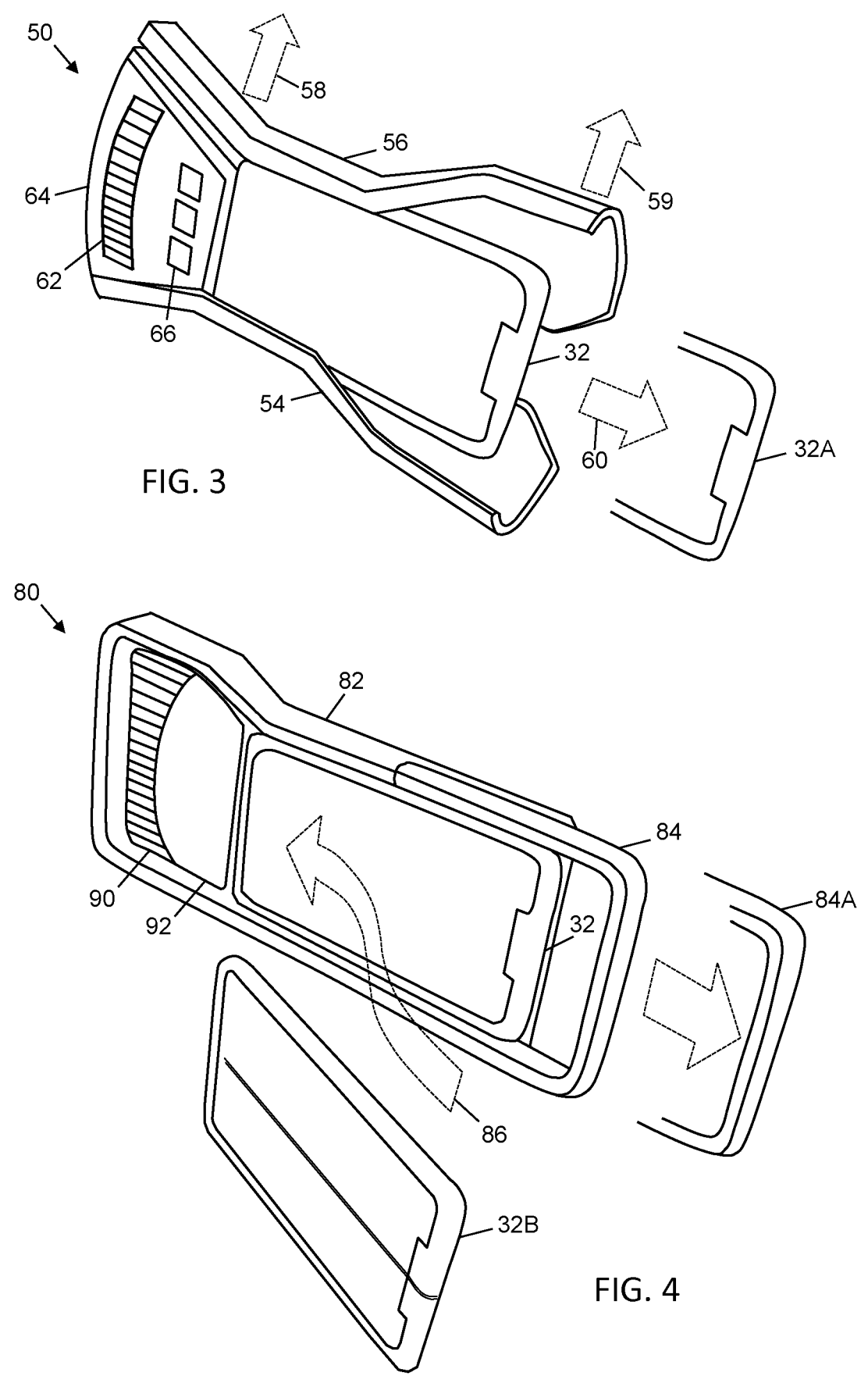

Referring to FIG. 3, there is shown an exemplary embodiment of the docking station 50 with a smart device 32 inserted. The docking station 50 has a lower, fixed gripping portion 54 and an upper, movable gripping portion 56, which can be moved upwards in the direction of the arrows 58, 59. In some embodiments, the docking station 50 has one or more springs (not shown) that bias the upper gripping portion 56 downwards to exert a gripping force on the smart device 32. The sprung upper gripping portion 56, in conjunction with the lower gripping portion 54, operate to retain the smart device 32 in place in the docking station 50. The inner surfaces of the gripping portions 54, 56 are in some embodiments lined with a high-friction liner, such as rubber, to help retain or lock the smart device 32 in place.

When the upper gripping portion 56 of the docking station 50 is raised, the smart device 32 can be removed sideways out of the docking station in the direction of arrow 60, to position 32A, and then reinserted when next required.

As the gripping portions 54, 56 of the docking station 50 are sprung together, the docking station is effectively expandable so that it can host smart devices 32 of different sizes. The docking station 50 is also able to accommodate smart devices 32 with different sizes of case (not shown).

When docked in the docking station 50, the smart device 32 is, for example, connected to the docking station via a USB port. For example, the smart device 32 is connected to a connector on a cable (not visible) that is accessible between the lower and upper gripping portions 54, 56. In other embodiments, the connector to which the smart device 32 connects is rigidly or semi-rigidly fixed in the docking station 50 in a position that aligns with the corresponding connector socket on the smart device. The smart device 32 may be charged via the cable as well as the cable providing a bi-directional communication link between the smart device 32 and the docking station 50.

In some embodiments, the docking station 50 is configured to accommodate a custom smart device case, in which the rider's smart device 32 is held. In this example, the smart device 32 is positioned in the case so that the necessary connections are properly made to the docking station 50 when the case with smart device are inserted as a unit into the docking station.

In some embodiments, the smart device 32 is communicatively connected to the docking station 50 via a Bluetooth™ connection. In some embodiments, other types of connectivity between the docking station 50 and the smart device 32 are used.

A gauge 62, e.g. an RPM meter, which forms part of the instrument cluster of the motorcycle, is shown on a display area 64 at the left side of the docking station 50. The display area 64 also includes indicator lights 66, which, for example, may be a turn-signal indicator, an engine warning light or a low-fuel warning light. In this example, the smart device 32 provides a supplementary display to the built-in display 64 of the motorcycle, which may also be supplementary to another display in another portion of the instrument cluster of the motorcycle. In other embodiments, the display area 64 of the docking station 50 acts as a second screen for the smart device 32. In this case, the gauge 62 is directly connected to the smart device 32 when the smart device is inserted into the docking station 50. The display are 64 can also be configured to represent other engine parameters according to the preference of the rider.

The battery of the smart device 32 may recharge wirelessly when the smart device is inserted in the docking station 50, if wireless recharging station is included in the docking station.

Referring to FIG. 4, there is shown another exemplary embodiment of the docking station 80. The docking station 80 has a frame with a fixed portion 82 and a sliding portion that forms a handle 84. The handle 84 of the frame is pulled out from the docking station 80, to position 84A, in order to slide the smart device 32 from position 32B into the docking station in the direction of arrow 86. Then, the handle 84 of the frame is set back into the docking station 80 in order to lock the smart device 32 in position.

When docked in the docking station 80, the smart device 32 is connected to the docking station via a USB port or via a Bluetooth™ connection. In some embodiments, other types of connectivity between the docking station 80 and the smart device 32 are used.

For example, the smart device 32 is connected to a connector on a cable that is accessible from within the fixed portion 82 of the frame of the docking station 80. In some embodiments, the docking station 80 is configured to accommodate a custom smart device case, in which the rider's smart device 32 is held. The smart device 32 is positioned in the case so that the necessary connections are properly made to the docking station 80 when the case with smart device are inserted as a unit into the docking station.

A gauge 90, e.g. an RPM meter, which forms part of the instrument cluster of the motorcycle, is shown on a display area 92 at left side of the docking station 80. In this example, the smart device 32 provides a supplementary display to the built-in display of the motorcycle. In other embodiments, the display area 92 of the docking station 80 acts as a second screen for the smart device 32. In this case, the gauge 90 is directly connected to the smart device 32 when the smart device is inserted into the docking station 80.

Figure 5:
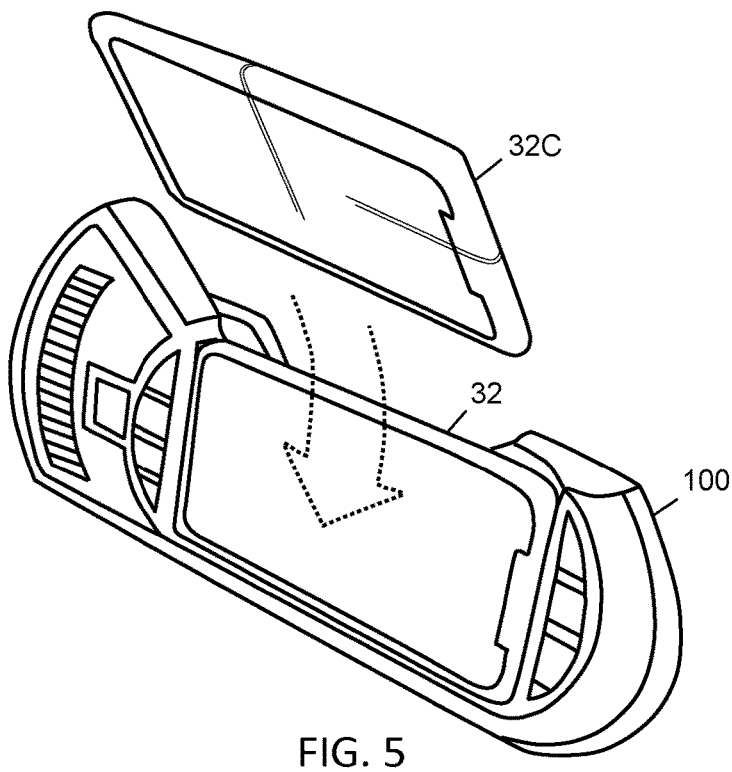
FIG. 5 is a drawing representing yet another smart device docking station according to an embodiment of the present invention.

Referring FIG. 5, there is shown a further exemplary embodiment of the docking station 100. In this embodiment, the smart device 32 is inserted from position 32C and slid downwards into the top part of the docking station 100. Slots in the docking station at either side of the smart device 32 retain the smart device in position. The fit is a snug or snap fit so that the smart device 32 is not loose. The smart device 32 is removed by pulling it upwards and away from the docking station 100.

Figure 6:
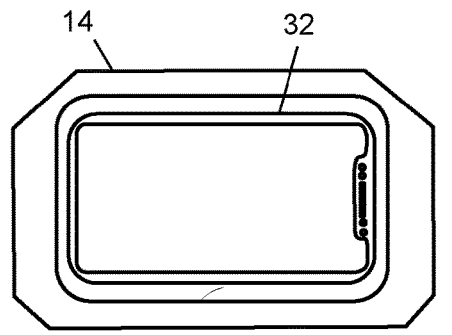
FIG. 6 is a diagram representing the interaction between the smart device, a control module and the ignition system, according to an embodiment of the present invention.
Figure 6:
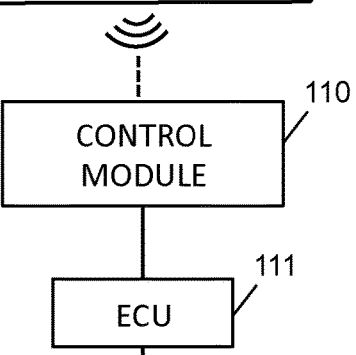

Referring to FIG. 6, a smart device 32 that is locked in a docking station 14 interacts with the control module 110 of the docking system. The control module 110 is also connected, via the engine control unit (ECU) 111 to the engine starter 112 or power-on switch. When the smart device 32 is docked in the docking station 14, it sends data directly to the control module 110. In response, after authentication of the smart device, the control module 110 commands the ECU 111 to enable the engine starter 112, allowing it to be activated by the rider. In some cases, the presence of the smart device 32 in the docking station 14 switches on the accessories of the motorcycle without the rider having to do anything other than to insert the smart device. The communication between the smart device 32, and the control module 110 is achieved wirelessly. The communication between the control module 110, the ECU 111 and the engine starter switch 112 is wired. In some embodiments, the connection between the smart device 32 and the control module 110 is wired.

When the smart device 32 is placed in the docking station 14, an authentication process is run, either directly with the smart phone 32 or though an encrypted communication network that verifies the legitimacy of the smart device 32. Authentication may involve the verification of an RFID (radio-frequency identification) tag in the smart device 32 or via near-field communications between the docking station and the smart device.

A further authentication step may be included to verify the identity of the rider, as the second step in a two-factor authentication process.

When the authentication is achieved, the control module 110 sends a command to the ECU 111 to enable the ignition switch 112 of the engine of the motorcycle so that it can be activated by the rider, who is the person who owns or has permission to use the smart device, or who was authenticated during the two-factor authentication process. In some embodiments, the smart device's tactile sensors (e.g. fingerprint detector) or facial recognition functions are used to verify the rider's identity and optionally usage profile.

Figure 7:
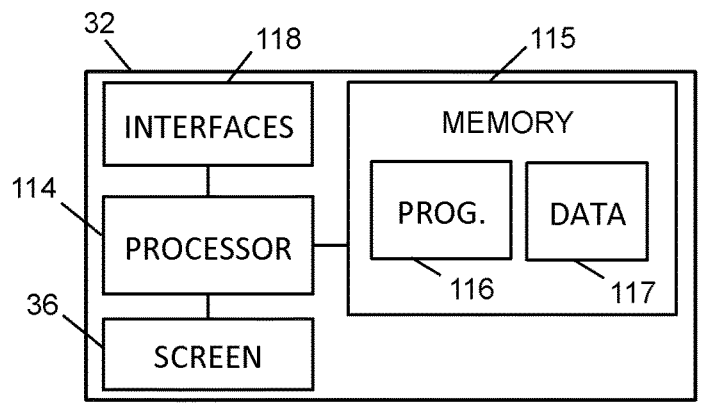
FIG. 7 is a block diagram representing various components of the smart device according to an embodiment of the present invention.

Referring to FIG. 7, components of the smart device 32 are shown. The smart device 32 includes a processor 114 that is connected to computer readable memory 115 in which are stored processor-executable instructions in the form of one or more programs 116 or applications, such as a Damon™ application. A program 116, when executed by the processor 114 provides, complements or communicates the functionality of one or more of the features of the docking system when the smart device 32 is docked in the docking station 14. For example, engine controls or engine-related information are displayed on the screen 36 of the smart device 32. Data 117 is also stored in the memory 115 and may be used by the processor 114 to authenticate the rider and provide one or more of the features of the docking system when the smart device is docked in it. Data 117 may also include data that is logged by the control module 110, such as engine parameters, vehicle parameters, trip parameters and hazards detected.

One or more interfaces 118 are connected to the processor 114. Interfaces 118 include, for example, a Bluetooth™ wireless transceiver, and a USB connector.

Figure 8:
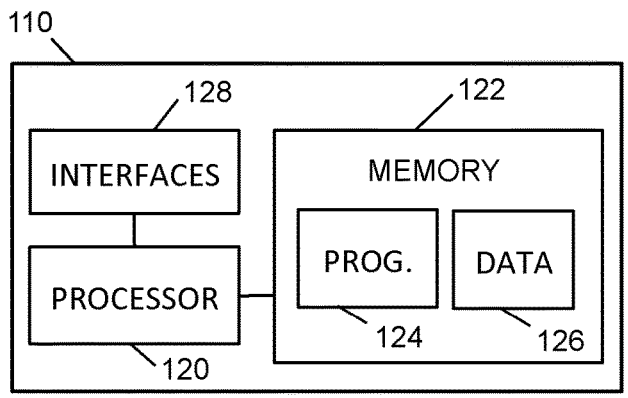
FIG. 8 is a block diagram representing various components of the control module according to an embodiment of the present invention.

Referring to FIG. 8, components of the control module 110 of the docking system are shown. The control module (for example, a Damon™ control module) includes a processor 120 that is connected to computer readable memory 122 in which are stored processor-executable instructions in the form of one or more programs 124 or applications. A program 124, when executed by the processor 120 provides the functionality of one or more of the features of the docking system, such as engine control features or retrieval of engine-related information for display on the screen 36 of the smart device 32. Data 126 is also stored in the memory 122 and may be used by the processor 120 to authenticate the rider and provide one or more of the features of the docking system. Data 126 may also include data that is logged by the control module 110, such as engine parameters, vehicle parameters, trip parameters and hazards detected.

One or more interfaces 128 are connected to the processor 120. Interfaces 128 include, for example, a Bluetooth™ wireless transceiver, a USB connector, a connection to the ECU, a connection to a sensor, and a connection to a haptic feedback device.

Figure 9:
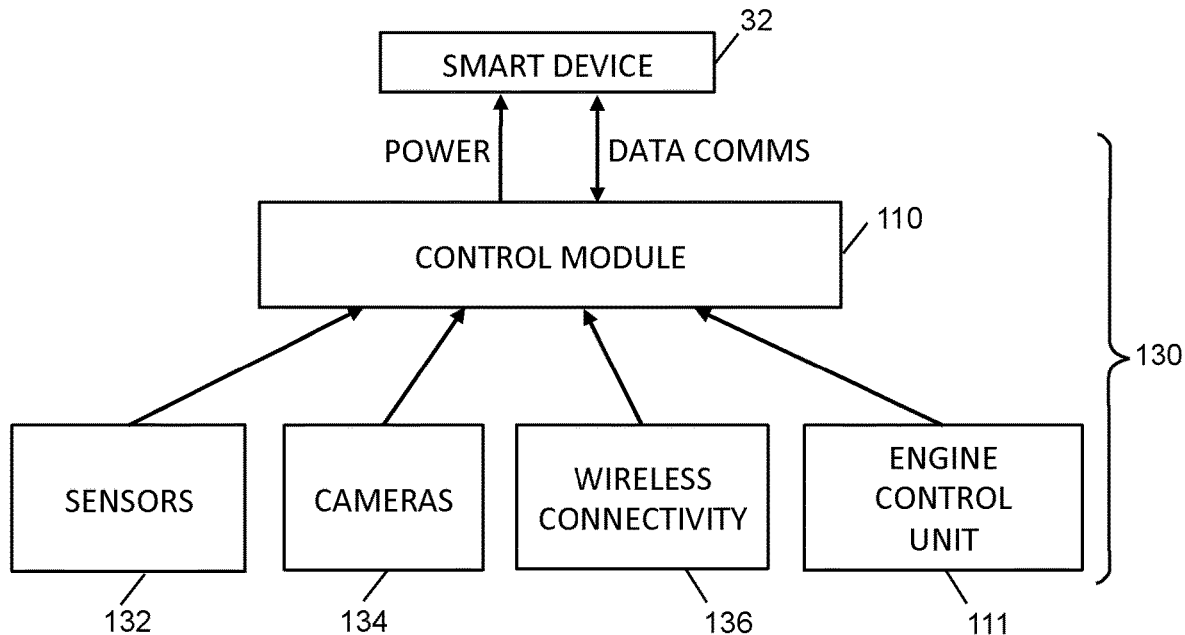
FIG. 9 is a block diagram representing a first configuration of a docking system, showing connections between a smart device, a control module and various other devices according to an embodiment of the present invention.

Referring to FIG. 9, there is shown the various modules that make up an exemplary docking system 130 with a smart device 32 that interacts with the control module 110 of the docking system. The control module 110 may be embedded in the docking station 14, or it may be located elsewhere on the motorcycle and connected via a wired connection to the docking station. The smart device 32 receives power from the control module 110, while data are exchanged on a bi-directional communication link between the smart device and the control module. The control module collects various data from sensors 132, cameras 134 and the motorcycle ECU 111. The control module 110 also collects data through wireless connectivity module 136 from devices that can be connected wirelessly to the control module via the wireless connectivity module.

Information such as radar, temperature, pressure and audio are collected from the onboard motorcycle sensors 132 by the control module 110. These sensors feed the smart display on the screen 36 of the smart device 32, providing information such as the speed, RPM, vehicle telematics, front and/or rear camera feed, GPS location, gear indicator, turn signal indication, neutral gear indication, battery level, regenerative braking level, charge indication, left and right lane mirror information from camera feed, and engine check warning indicator. In some embodiments, the control module 110 triggers haptic devices, lights, visual displays and/or vibrations as feedback mechanisms in order to provide an alert to the rider of the vehicle.

The smart device 32 is used in the operation of the motorcycle 12, e.g. by enabling the ignition of the motorcycle, by displaying one or more parameters of the motorcycle that have been obtained from the ECU 111 and that would normally be displayed on an instrument cluster, and by receiving inputs from a rider to control one or more operating functions of the motorcycle.

Figure 10:
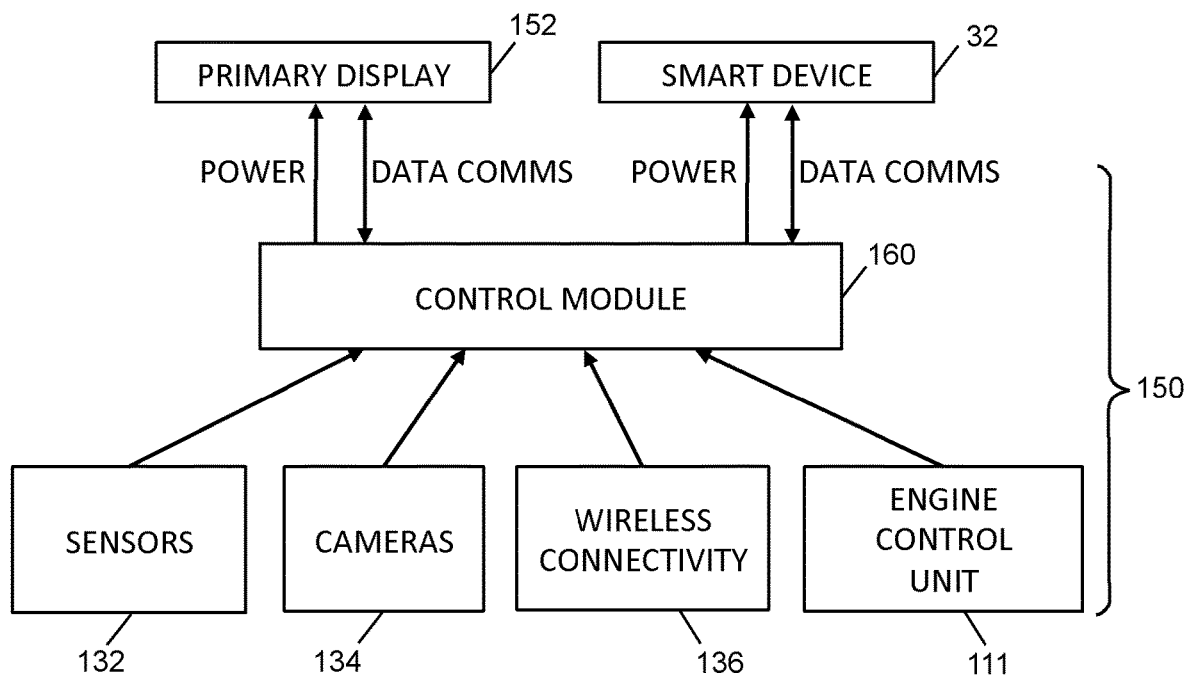
FIG. 10 is a block diagram representing a second configuration of a docking system, showing connections between a primary display of the motorcycle, a smart device, a control module and various other devices according to an embodiment of the present invention.

Referring to FIG. 10, there is shown an exemplary embodiment of a docking system 150, where the smart device 32 is configured as a secondary display. The smart device 32 is secondary to a primary display 152 that is integrated in the motorcycle during manufacture. The control module 160 may be embedded in the docking station 14 or it may be located elsewhere on the motorcycle and connected via a wired connection to the docking station. The smart device 32 receives power from the control module 160, while data are exchanged on a bi-directional communication link between the smart device 32 and the control module. The primary display 152 receives power from the control module 160, while data are exchanged on a bi-directional communication link between the primary display 152 and the control module. The control module collects various data from sensors 132, cameras 134 and the motorcycle ECU 111. The control module 160 also collects data through wireless connectivity module 136 from devices that can be connected wirelessly to the control module.

The primary display 152, which usually forms part of the motorcycle as manufactured, shows the information gathered from the ECU 168, while the smart device 32 shows supplementary information such as GPS location, maps, front or rear camera feed, left and right mirror information, or vehicle telematics. The secondary display, i.e. the smart device 32, may also display some of the information that would normally be displayed on a primary display in the absence of a docked smart device.

Referring to FIG. 11, there is shown another use of the control module 180. In this embodiment, all the information collected by the control module 180 from the sensors 132, cameras 134, devices communicating via wireless connectivity module 136, ECU 111 and other peripherals is displayed in one page or a series of pages that the rider configures for his specific needs. In this example, the primary display 172 is either the screen that is included with the motorcycle at manufacture or the screen 36 of the smart device 32. The control module 180 has the ability to dynamically switch the information on the primary display 172 based on the context of a user's riding situation. For example, when the vehicle has stopped at an intersection, the primary display automatically switches to display the information provided by the rear camera. Once the motorcycle is back in motion, then the information switches back to speed, RPM, or other vehicle information that the rider desires.

When the above applies to the use of a smart device 32 to provide the primary display 172, the components 170 form the docking system.

The ability to dynamically switch the page displayed also applies to a smart device 32 when the smart device is used as a secondary display.

Referring to FIG. 12, a process carried out by a docking system 130 is shown. In step 200, one or more of the sensors 132 sense or detect the environment of the motorcycle and/or one or more operational parameters of the motorcycle, and/or one or more of the cameras 134 capture images or videos of or detect the environment of the motorcycle. In step 202, the control module 110 receives signals from the sensors 132 and/or camera 134. In step 204, the control module 110 analyzes the signals received from the sensors 132 and cameras 134. In step 206, the control module 110 determines that the signals represent a hazard to the motorcycle rider.

In response to the control module 110 making the determination of the hazard, then, in step 208, the control module sends a notification to the smart device 32, which displays the hazard information on its screen 36. In some embodiments, the smart device 32 displays recommendations in relation to the hazard notification. For example, the smart device may display recommendations such as switch lane, brake or change itinerary.

In other embodiments, a hazard is detected by analyzing the data feed received via the wireless connectivity module 136.

Referring to FIG. 13, a process is shown for the use of the smart device 32 in the docking system 130. The smart device 32 is docked in the docking station 14 in step 220, by the rider. The system proceeds to authentication of the rider in step 224. After that, when the rider is recognized by the smart device 32, the motorcycle ignition system is enabled by the control module 110 in step 228. The rider is then able to switch on the ignition, and does so in step 232. Then, in step 236, the data from various devices mounted on the motorcycle such as the cameras 134 and the sensors 132 are logged in the control module 110 in order for the current status of the motorcycle to be displayed on the smart device 32. In other embodiments, the display of the data or information derived from the data may be displayed on a primary display 152, or on the smart device 32 operating as a secondary screen.

The docked smart device 32 can also perform the functions of a data logging device to capture information obtained from the motorcycle. Activation of this feature is through the smart device's application software 116 that allows the smart device 32 to connect to the control module 110. In this way, the smart device 32 acts as a redundant backup data logger, supplemental data logger adding storage expansion, and/or additional logging capability for third party devices, such as motorcycle HUD (heads-up display) helmet, action cameras, Bluetooth™ devices, other sensors not forming part of sensors 132, etc.

Referring to FIG. 14, there is shown an example of how the docking system 130 intelligently displays information. In step 250, after the smart device 32 has been docked in the docking station 14, the rider authenticated and the ignition started, the smart device displays the word "ON", for example, as the smart device receives the confirmation from the control module 110 that the motorcycle ignition has been started. If the motorcycle is electric, then the "ON" signal represents that the motorcycle is ready to pull away. Then, the motorcycle starts moving when the rider activates the accelerator in step 254. After that, the display of the smart device 32 switches to showing the speed of the motorcycle in step 258. When the rider brakes and stops the motorcycle, in step 262, the display of the smart device 32 switches to displaying the rear view camera image to facilitate any parking maneuvers or to display any vehicles that may be behind the motorcycle, in step 266. Other informational screens (e.g. navigation, remote video) can also be displayed according to the activity or mode of the motorcycle, while the smart device 32 is docked in the docking system 130.

C. Variations

While particular examples of a docking station 14 have been given, other physical arrangements may be used in other embodiments for mounting or holding the smart device 32 in position on the motorcycle 12.

The docked smart device 32 can provide vehicle-to-vehicle, mobile device-to-mobile device, and/or vehicle-to-mobile device connectivity to other vehicles with similar docked smart devices. Information transferred from one device and/or one vehicle can include vehicle statistics, alerts, bearings and directions of other vehicles, weather, traffic and rider information, for example.

As a supplemental wireless connectivity source, supplementary to wireless connectivity module 136, the docked smart device 32 can provide a bridge between the control module 110 installed on the motorcycle and a remote data storage (e.g. a remote server) and analysis service (e.g. Damon™ Data Cloud) by acting as an internet gateway using its own cellular radio to establish this connection.

The GPS navigation system may be incorporated into the program 116 (e.g. Damon™ application).

The display on screen 36 may be transmitted to another screen that is remote from the motorcycle. Camera feeds from the various cameras 134 on the motorcycle may also be transmitted to another remote screen for display thereon. The other, remote screens may be on tablets, laptops, other smart phones, desktop computers or custom display modules, for example.

The docking system disclosed herein may be used in cars, trucks and other vehicles.

In general, unless otherwise indicated, singular elements may be in the plural and vice versa with no loss of generality. The use of the masculine can refer to masculine, feminine or both.

Sending a signal can be interpreted to be either the actual creation of a signal that is transmitted from a sensor or the ceasing of a signal that is being created by and transmitted from the sensor. Either way, the change in output of the sensor can be interpreted as a signal. A null signal may also be considered to be a signal. The signal may, for example, be a change in voltage, resistance, capacitance or current.

Throughout the description, specific details have been set forth in order to provide a more thorough understanding of the invention. However, the invention may be practiced without these particulars. In other instances, well known elements have not been shown or described in detail and repetitions of steps and features have been omitted to avoid unnecessarily obscuring the invention. Accordingly, the specification is to be regarded in an illustrative, rather than a restrictive, sense.

The detailed description has been presented partly in terms of methods or processes, symbolic representations of operations, functionalities and features of the invention. These method descriptions and representations are the means used by those skilled in the art to most effectively convey the substance of their work to others skilled in the art. A software implemented method or process is here, and generally, understood to be a self-consistent sequence of steps leading to a desired result. These steps require physical manipulations of physical quantities. Often, but not necessarily, these quantities take the form of electrical or magnetic signals or values capable of being stored, transferred, combined, compared, and otherwise manipulated. It will be further appreciated that the line between hardware and software is not always sharp, it being understood by those skilled in the art that the software implemented processes described herein may be embodied in hardware, firmware, software, or any combination thereof. Such processes may be controlled by coded instructions such as microcode and/or by stored programming instructions in one or more tangible or non-transient media readable by a computer or processor. The code modules may be stored in any computer storage system or device, such as hard disk drives, optical drives, solid state memories, etc. The methods may alternatively be embodied partly or wholly in specialized computer hardware, such as ASIC or FPGA circuitry.

It will be clear to one having skill in the art that further variations to the specific details disclosed herein can be made, resulting in other embodiments that are within the scope of the invention disclosed. Steps may be added to the flowcharts, or one or more steps may be removed without altering the main function of the invention. Flowcharts from different figures may be combined in different ways. Flowcharts described in relation to one module may be applied to other similar modules. Modules may be divided into constituent modules or combined into larger modules. All parameters and configurations described herein are examples only and actual ones of such depend on the specific embodiment. Accordingly, the scope of the invention is to be construed in accordance with the substance defined by the following claims.

The invention claimed is:

1. A system for operation of a motorcycle with a personal communication device comprising:
    a docking station mounted in a cockpit of the motorcycle, the docking station dimensioned to hold the personal communication device; and
    a control module that is mounted in the motorcycle and communicatively connected to:
        an engine control unit (ECU) of the motorcycle; and
        the personal communication device, when the personal communication device is in the docking station;
    wherein the control module comprises a processor and a non-transitory computer-readable memory storing computer-readable instructions which, when executed by the processor cause the control module to:
        detect a presence of the personal communication device in the docking station;
        authenticate the personal communication device in response to detecting its presence;
        send, in response to authenticating the personal communication device, a command to the ECU to enable an ignition of the motorcycle;
        receive a parameter of the motorcycle from the ECU;
        transmit the parameter to the personal communication device for display on the personal communication device;
        detect a change in a status of the motorcycle from moving forwards to being stationary; and
        in response to detecting the change, send a command to the personal communication device that changes a display on a user interface of the personal communication device from a first page comprising a speedometer to a second page comprising an image captured by a rear-view camera that is connected to the control module.

2. The system of claim 1, wherein the computer-readable instructions, when executed by the processor, cause the control module to:
    receive an input via the user interface; and
    send a command to the ECU to operate a function of the motorcycle according to the input.

3. The system of claim 1, wherein the control module is configured to authenticate the personal communication device by authenticating an authorized user of the personal communication device.

4. The system of claim 1, wherein the personal communication device is a smartphone with a touchscreen.

5. The system of claim 1 comprising one or more sensors connected to the control module and one or more further cameras connected to the control module, wherein the computer-readable instructions, when executed by the processor, cause the control module to:
    receive signals from the one or more sensors and the one or more further cameras;
    analyze the signals;
    determine that the signals represent a hazard; and
    transmit a notification of the hazard to the personal communication device for display on the personal communication device.

6. The system of claim 1, wherein the docking station is mounted on a dashboard of the motorcycle.

7. A method for operating a motorcycle with a personal communication device comprising:
    detecting, by a control module, a presence of the personal communication device in a docking station mounted in a cockpit of the motorcycle, wherein the control module is mounted in the motorcycle and communicatively connected to an engine control unit (ECU) of the motorcycle;
    authenticating, by the control module, the personal communication device in response to detecting its presence;
    sending, by the control module, in response to authenticating the personal communication device, a command to the ECU to enable an ignition of the motorcycle;
    receiving, by the control module, a parameter of the motorcycle from the ECU;
    transmitting the parameter to the personal communication device for display on a user interface thereof;
    detecting a change in a status of the motorcycle from moving forwards to being stationary; and in response to detecting the change, sending a command to the personal communication device that changes a display on the user interface from a first page comprising a speedometer to a second page comprising an image captured by a rear-view camera that is connected to the control module.

8. The method of claim 7, comprising:
receiving, by the control module, an input via the user interface; and
sending, by the control module, a command to the ECU to operate a function of the motorcycle according to the input.

9. The method of claim 7, wherein the authenticating comprises authenticating a user of the personal communication device.

10. The method of claim 7, wherein the personal communication device is a smartphone and the user interface is a touchscreen.

11. The method of claim 7 comprising:
receiving, by the control module, signals from:
one or more sensors connected to the control module; and
one or more further cameras connected to the control module;
analyzing, by the control module, the signals;
determining, by the control module, that the signals represent a hazard; and
transmitting, by the control module, a notification of the hazard to the personal communication device for display thereon.

12. The method of claim 7, wherein the docking station is mounted on a dashboard of the motorcycle.

13. A motorcycle that uses a personal communication device for operation of at least one function of the motorcycle comprising:
a docking station mounted in a cockpit of the motorcycle, the docking station dimensioned to hold the personal communication device; and
a control module that is mounted in the motorcycle and communicatively connected to:
an engine control unit (ECU) of the motorcycle; and
the personal communication device, when the personal communication device is in the docking station;
wherein the control module comprises a processor and a non-transitory computer-readable memory storing computer-readable instructions which, when executed by the processor cause the control module to:
detect a presence of the personal communication device in the docking station;
authenticate the personal communication device in response to detecting its presence;
send, in response to authenticating the personal communication device, a command to the ECU to enable an ignition of the motorcycle;
receive a parameter of the vehicle from the ECU;
transmit the parameter to the personal communication device for display thereon;
detect a change in a status of the motorcycle from moving forwards to being stationary; and
in response to detecting the change, send a command to the personal communication device that changes a display on a user interface of the personal communication device from a first page comprising a speedometer to a second page comprising an image captured by a rear-view camera that is connected to the control module.

14. The motorcycle of claim 13, wherein the computer-readable instructions, when executed by the processor, cause the control module to:
receive an input via the user interface; and
send a command to the ECU to operate a function of the motorcycle according to the input.

15. The motorcycle of claim 13 comprising one or more sensors connected to the control module and one or more further cameras connected to the control module, wherein the computer-readable instructions, when executed by the processor, cause the control module to:
receive signals from the one or more sensors and the one or more further cameras;
analyze the signals;
determine that the signals represent a hazard; and
transmit a notification of the hazard to the personal communication device for display thereon.

16. The motorcycle of claim 13 comprising an instrument cluster on which a further parameter of the motorcycle is displayed.

17. The motorcycle of claim 13, wherein the personal communication device has a touchscreen and the docking station has a screen that functions as a second screen of the personal communication device.

18. The motorcycle of claim 13, wherein the computer-readable instructions, when executed by the processor, cause the control module to:
log data related to the motorcycle; and
transmit the data to the personal communication device for storage thereon.

19. The motorcycle of claim 13, wherein the computer-readable instructions, when executed by the processor, cause the control module to:
log data related to the motorcycle; and
transmit the data via the personal communication device to a remote server for storage thereon.

20. The motorcycle of claim 13, wherein:
the personal communication device is a smartphone with a touchscreen; and
the motorcycle has no display screen.

21. The motorcycle of claim 13, wherein:
the personal communication device is a smartphone with a touchscreen; and
the motorcycle has a display screen.

* * * * *

UNITED STATES PATENT AND TRADEMARK OFFICE
CERTIFICATE OF CORRECTION

| | | |
|---|---|---|
| PATENT NO. | : 11,351,960 B2 | Page 1 of 1 |
| APPLICATION NO. | : 16/972771 | |
| DATED | : June 7, 2022 | |
| INVENTOR(S) | : Giraud et al. | |

It is certified that error appears in the above-identified patent and that said Letters Patent is hereby corrected as shown below:

In the Claims

Column 13, Line 56, the word "vehicle" should be amended to --motorcycle--

Signed and Sealed this
Nineteenth Day of July, 2022

Katherine Kelly Vidal
*Director of the United States Patent and Trademark Office*